(12) United States Patent
Nagai et al.

(10) Patent No.: US 8,324,124 B2
(45) Date of Patent: Dec. 4, 2012

(54) GLASS SUBSTRATE AND ITS PRODUCTION PROCESS

(75) Inventors: Kensuke Nagai, Tokyo (JP); Yuichi Kuroki, Tokyo (JP); Kei Maeda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/163,820

(22) Filed: Jun. 20, 2011

(65) Prior Publication Data

US 2011/0251044 A1 Oct. 13, 2011

Related U.S. Application Data

(63) Continuation of application No. PCT/JP2009/067799, filed on Oct. 14, 2009.

(30) Foreign Application Priority Data

Dec. 25, 2008 (JP) ................................ 2008-330200

(51) Int. Cl.
C03C 3/087 (2006.01)
C03B 18/20 (2006.01)

(52) U.S. Cl. ............. 501/70; 65/32.1; 65/32.5; 65/99.2; 65/99.5

(58) Field of Classification Search ............... 501/70; 65/99.2–99.6, 32.1, 32.6
See application file for complete search history.

(56) References Cited

U.S. PATENT DOCUMENTS

| 5,858,897 A | 1/1999 | Maeda et al. |
|---|---|---|
| 5,908,794 A | 6/1999 | Maeda et al. |
| 7,892,999 B2 | 2/2011 | Nagai et al. |
| 8,071,494 B2 * | 12/2011 | Nagai et al. .................... 501/69 |
| 2002/0010066 A1 | 1/2002 | Nakashima et al. |
| 2009/0253567 A1 | 10/2009 | Nagai et al. |
| 2010/0137122 A1 | 6/2010 | Nagai et al. |

FOREIGN PATENT DOCUMENTS

| JP | 9-301733 | 11/1997 |
|---|---|---|
| JP | 10-152338 | 6/1998 |
| JP | 10-255669 | 9/1998 |
| JP | 10-334813 | 12/1998 |
| JP | 11-433470 | 2/1999 |
| JP | 2000-351649 | 12/2000 |
| JP | 2001-58843 | 3/2001 |
| JP | 2004-189591 | 7/2004 |
| WO | 2008/056527 | 5/2008 |

OTHER PUBLICATIONS

International Search Report issued Jan. 19, 2010 in PCT/JP09/067799 filed Oct. 14, 2009.

* cited by examiner

*Primary Examiner* — Karl Group
(74) *Attorney, Agent, or Firm* — Oblon, Spivak, McClelland, Maier & Neustadt, L.L.P.

(57) ABSTRACT

A process for producing a glass substrate, which includes forming molten glass obtained by melting raw materials into a glass ribbon in a float bath, annealing the glass ribbon by a cooling apparatus, and cutting the glass ribbon to form the glass substrate, where the hydrogen concentration in the atmosphere of a float bath exceeds 3%, and the glass retention time in the float bath is from 4 to 15 minutes.

18 Claims, No Drawings

GLASS SUBSTRATE AND ITS PRODUCTION PROCESS

CROSS REFERENCE TO RELATED APPLICATION

This application is a continuation of PCT/JP09/067,799, filed on Oct. 14, 2009, and claims priority to Japanese Patent Application No. 2008-330200, filed on Dec. 25, 2008.

TECHNICAL FIELD

The present invention relates to a glass substrate, particularly a glass substrate preferably used for a flat panel display, more particularly for a plasma display panel (PDP), and its production process.

BACKGROUND ART

In a procedure for production of a PDP, various heat treatments are applied to a glass substrate. Accordingly, a glass substrate for a PDP is required to have a high glass transition temperature to such an extent that no thermal deformation nor thermal shrinkage occurs by the heat treatment, and have a thermal expansion coefficient close to that of soda lime glass. Further, a PDP becomes large in recent years, and accordingly a glass substrate having a low specific gravity has been required.

As a glass substrate to achieve such objects, for example a glass substrate as disclosed in Patent Document 1 may be mentioned.

Further, in addition to the above objects, a glass substrate for a PDP is required not to undergo yellowing. The yellowing is a phenomenon such that the surface of a glass substrate is discolored to be yellow when silver electrodes for generating plasma discharge are formed by firing on the surface of the glass substrate.

To solve the above yellowing, there are known, for example, a flat panel display substrate (e.g. Patent Document 2) wherein a surface on which metal electrodes are to be formed is polished to remove a reducing foreign layer formed on the surface, a plasma display device (e.g. Patent Document 3) wherein the amount of $Fe_2O_3$ is less than 2,000 ppm (0.2%) and metal electrodes are made of silver, and a process for producing a glass substrate for an image display device (e.g. Patent Document 4) wherein control is made to reduce the reduction power in a float bath when the amount of $Sn^{2+}$ in the glass substrate exceeds a tolerance.

PRIOR ART DOCUMENTS

Patent Documents

Patent Document 1: JP-A-10-152338
Patent Document 2: JP-A-10-255669
Patent Document 3: JP-A-10-334813
Patent Document 4: JP-A-2004-189591

DISCLOSURE OF INVENTION

Technical Problem

It has been very difficult to obtain a glass substrate which satisfies all the above objects, i.e. a glass substrate which has a high glass transition temperature, has a thermal expansion coefficient close to that of soda lime glass, has a low specific gravity and does not undergo yellowing. For example, the glass substrate disclosed in the above Patent Document 1 does not achieve suppression of the yellowing. Further, although an effect of suppressing the yellowing is confirmed by the method disclosed in Patent Document 2, a glass plate produced should be polished, and the cost for polishing is enormous. Further, the glass transition temperature, the thermal expansion coefficient and the specific gravity are not satisfactory. Further, by the methods disclosed in Patent Documents 3 and 4, an effect of suppressing the yellowing is not necessarily obtained.

It is an object of the present invention is to provide a glass substrate which achieves such objects, of which the yellowing is suppressed, and which has good melting characters and is produced with high productivity.

Solution to Problem

The present inventors have found that the following glass substrate of the present invention achieves the above objects. Further, they have found that such a glass substrate can be produced by the production process of the present invention.

The glass substrate of the present invention is a glass substrate which has a composition comprising, as represented by mass percentage based on oxides,

| | |
|---|---|
| $SiO_2$ | 55 to 65%, |
| $Al_2O_3$ | 4 to 8%, |
| MgO | 6 to 9%, |
| CaO | 0.1 to 5%, |
| SrO | 0.5 to 6%, |
| BaO | 0 to 2%, |
| MgO + CaO + SrO + BaO | 6.6 to 19%, |
| $Na_2O$ | 0 to 5%, |
| $K_2O$ | 9.5 to 21%, |
| $Na_2O + K_2O$ | 10 to 22%, |
| $ZrO_2$ | 0.5 to 5%, |
| $Fe_2O_3$ | 0.06 to 0.15%, | which has a specific gravity of at most 2.7, which has an average thermal expansion coefficient from 50 to 350° C. of from $80\times10^{-7}$/° C. to $90\times10^{-7}$/° C., which has a glass transition temperature of at least 640° C., and wherein when the viscosity is n, the temperature at which $\log \eta = 2$ is satisfied is at most 1,550° C., and the yellow coloring b* on the glass surface is at most 8 after a silver paste is applied on the glass surface, followed by firing, and then the silver paste is removed.

Further, the production process of the present invention is a process for producing the glass substrate of the present invention, which comprises forming molten glass obtained by melting raw materials into a glass ribbon in a float bath, annealing the glass ribbon by a cooling means and cutting it, wherein the hydrogen concentration in the atmosphere of a float bath exceeds 3%, and the glass retention time in the float bath is from 4 to 15 minutes.

Advantageous Effects of Invention

According to the present invention, it is possible to obtain a glass substrate which has a high glass transition temperature, which has a thermal expansion coefficient close to that of soda lime glass, which has a low specific gravity, which will hardly undergo yellowing, and which further has good melting characters and is thereby produced with high productivity.

The glass substrate of the present invention can be suitably used as a glass substrate for a PDP.

DESCRIPTION OF EMBODIMENTS

Now, the composition of the glass substrate of the present invention will be described below. Here, the content, the addition amount and the like are as represented by mass percentage unless otherwise specified, and will be represented by % hereinafter.

$SiO_2$ is a component to form a network of the glass. If its content is less than 55%, the glass will be poor in the heat resistance and tends to be brittle. It is preferably at least 59%. On the other hand, if it exceeds 65%, the thermal expansion coefficient will be too low. It is preferably at most 64%, more preferably at most 63%, further preferably at most 62%.

$Al_2O_3$ is added in a content of at least 4% to increase the glass transition temperature thereby to improve the heat resistance. On the other hand, if its content exceeds 8%, the glass melting characters tend to go worse. It is preferably from 4 to 7.5%, more preferably from 4 to 7%, further preferably from 4.5 to 6.5%.

MgO is added in a content of at least 6% to decrease the viscosity when the glass is melted thereby to accelerate the melting. On the other hand, if its content exceeds 9%, the glass tends to have a high thermal expansion coefficient and to be brittle. It is preferably from 6.5 to 9%, more preferably from 7 to 9%, further preferably from 7.5 to 9%.

CaO is added in a content of at least 0.1% to decrease the viscosity when the glass is melted thereby to accelerate the melting. Its content is preferably at least 0.5%, more preferably at least 1%, further preferably at least 2%. On the other hand, if it exceeds 5%, the glass tends to have a high thermal expansion coefficient and to be brittle. Further, the devitrification temperature is likely to exceed the forming temperature (a temperature at which the glass has a viscosity of $10^4$ dPa·s) by the float process, and accordingly forming by the float process may be difficult. CaO is contained preferably in a content of at most 4.5%.

SrO is added in a content of at least 0.5% since it has an effect to decrease the viscosity when the glass is melted thereby to accelerate the melting. However, if its content exceeds 6%, the glass tends to be brittle. It is preferably from 1.6%, more preferably from 2 to 6%, further preferably from 3 to 5%.

BaO may be added since it has an effect to decrease the viscosity when the glass is melted thereby to accelerate the melting. However, if its content exceeds 2%, the glass tends to be brittle. Its content is preferably at most 1%. Considering the environmental burden, the reduction of the specific gravity and the scratch resistance, its content is preferably at most 0.5%, and it is more preferred that substantially no BaO is contained.

The total content of MgO, CaO, SrO and BaO is at least 6.6% in order that the viscosity when the glass is melted is decreased so that the glass is easily melted. In order that the glass is more easily melted, the total content is preferably at least 7%, more preferably at least 8%, further preferably at least 10%. On the other hand, if the total content exceeds 19%, the glass tends to be brittle, and the devitrification temperature tends to be high. From this viewpoint, the total content is preferably at most 17%, more preferably at most 16.5%, further preferably at most 16%.

$Na_2O$ may not be contained when $K_2O$ is contained, however, it has an effect to decrease the viscosity when the glass is melted thereby to accelerate the melting, and thus it may be contained. In such a case, it is contained preferably in a content of at least 1%. On the other hand, if its content exceeds 5%, the thermal expansion coefficient may be too high, and the chemical durability and the glass transition temperature may be decreased, and the electrical resistance may be too small. From this viewpoint, its content is preferably at most 4.5%, more preferably at most 4%. Accordingly, the content is more preferably from 1 to 4%.

$K_2O$ has an effect to decrease the viscosity when the glass is melted thereby to accelerate the melting, and is a component which will not lead to deterioration of the chemical durability and a decrease in the glass transition temperature as compared with $Na_2O$, and accordingly it is contained in a content of at least 9.5%. It is contained preferably in a content of at least 10%. On the other hand, if its content exceeds 21%, the thermal expansion coefficient will be too high, and the chemical durability will be decreased. From this viewpoint, its content is preferably at most 14%.

The total content of $Na_2O$ and $K_2O$ is at least 10% in order that the viscosity when the glass is melted is decreased so that the glass is easily melted. The total content is preferably at least 12%. On the other hand, if the total content exceeds 22%, it is highly possible that the chemical durability is decreased, and the electrical resistance is small. From this viewpoint, the total content is preferably at most 17%.

$ZrO_2$ has an effect to increase the glass transition temperature and to improve the chemical durability of the glass, and thus it is contained in a content of at least 0.5%. It is contained preferably in a content of at least 2%. On the other hand, if its content exceeds 5%, the glass tends to be brittle. It is contained preferably in a content of at most 4.8%, more preferably at most 4.5%.

$Fe_2O_3$ is contained in a content of at least 0.06% with a view to improving the melting characters. Further, to suppress the glass yellowing, it is contained in a content of at most 0.15%. It is contained in a content of preferably from 0.06 to 0.14%, more preferably from 0.07 to 0.13%, further preferably from 0.08 to 0.12%.

Of the glass substrate of the present invention, the average $Fe^{2+}$ content in a surface layer with a depth of up to 10 μm from the glass substrate surface on a side where silver electrodes are to be formed, is preferably at most 0.0725% as converted as $Fe_2O_3$.

In the glass substrate of the present invention, the difference between the $SiO_2$ content and the $Al_2O_3$ content is preferably at least 49%. In order to obtain glass which has a higher glass transition temperature and is less likely to be brittle, the above difference is more preferably at least 50%, further preferably at least 52%. On the other hand, in order that the glass is more easily melted, the above difference is preferably at most 60%, more preferably at most 59%, further preferably at most 57%.

To the glass substrate of the present invention, at least one member selected from the group consisting of $As_2O_3$, $Sb_2O_3$, $P_2O_5$, F and Cl may be added in a total content of at most 2% in addition to the above components to improve the melting characters, refining abilities and formability of the glass. The respective contents are preferably at most 0.5% for the refining abilities with respect to $As_2O_3$ and $Sb_2O_3$, to maintain the glass transition temperature high with respect to $P_2O_5$, and to accelerate vitrification with respect to F and Cl. Considering the environmental burden, it is preferred that substantially no As, Sb, F nor Cl, particularly As nor Sb, are contained, that is, their contents will not exceed the level of impurities.

Further, to improve the chemical durability of the glass substrate, $La_2O_3$, $TiO_2$ and $SnO_2$ may be added in a total content of at most 5%. Further, a colorant such as CoO, NiO, Se or $Nd_2O_3$ may be added to adjust the color tone of the glass. The total content of such colorants is preferably at most 1%.

Further, $B_2O_3$ may be added to improve the melting characters. However, its content is preferably less than 1.5% since its excessive addition will lower the thermal expansion coefficient. It is preferred that substantially no $B_2O_3$ is added so as to prevent bad influences over formation by the float process.

Further, ZnO may be added to improve the melting characters, however, if it is added in a content at least 5%, it may be reduced in a float bath to cause defects.

Further, $Li_2O$ may be added to improve the melting characters, however, if it is added in a content of at least 3%, the glass transition temperature may be low.

The glass substrate of the present invention thus obtained has a specific gravity of at most 2.7, more preferably less than 2.6. Further, it has an average thermal expansion coefficient from 50 to 350° C. of from $80 \times 10^{-7}$/° C. to $90 \times 10^{-7}$/° C. Further, it has a glass transition temperature of at least 640° C. Further, when the viscosity is the temperature at which log $\eta=2$ is satisfied is at most 1,550° C. Further, the yellow coloring b* of the glass surface is at most 8 after a silver paste is applied on the surface, followed by firing, preferably firing at 560° C. for one hour, and then the silver paste is removed, preferably by an acid. Further, log $\rho$ ($\rho$ is the volume resistivity ($\Omega \cdot cm$) at 150° C.) is preferably at least 10.5, more preferably at least 11, further preferably at least 11.5.

The acid to be used to remove the silver paste may, for example, be nitric acid or sulfuric acid, and is preferably nitric acid.

Now, the process for producing the glass substrate of the present invention will be described.

The process for producing the glass substrate of the present invention may be the same as a conventional process for producing plate glass for a flat panel display. That is, it is a process for producing a glass substrate, which comprises forming molten glass obtained by melting raw materials to plate glass in a float bath, annealing the plate glass by a cooling means and cutting it, wherein the hydrogen concentration in the atmosphere of a float bath exceeds 3%, and the glass retention time in the float bath is from 4 to 15 minutes.

Usually, to suppress the coloring of silver, the hydrogen concentration is set low, for example, at most 3%. However, with respect to the glass substrate of the present invention, the coloring of silver can be suppressed even when the hydrogen concentration exceeds 3%. Therefore, it is possible to suppress oxidation of molten tin by making the hydrogen concentration exceed 3% thereby to suppress adhesion of defects on the glass.

In a case where the glass substrate of the present invention obtained by such a production process is used as a flat panel display substrate, usually, silver electrodes are formed on the surface of the glass ribbon on the side which had not been in contact with molten tin in the float bath.

The hydrogen concentration in the atmosphere of the float bath is preferably at least 5%, more preferably at least 7%. Further, it is preferably at most 20%, more preferably at most 15%.

The glass retention time in the float bath is more preferably at most 13 minutes, further preferably at most 11 minutes, particularly preferably at most 9 minutes. However, if the glass retention time in the float bath is insufficient, it is difficult to form the glass into a glass ribbon having desired thickness and properties (for example, compaction, flatness, etc.). Accordingly, the glass retention time in the float bath is more preferably at least 5 minutes.

The temperature of the surface of the glass ribbon which passes through the float bath is preferably at most 1,200° C., more preferably at most 1,190° C., further preferably at most 1,170° C. Further, the temperature at which the annealing is started is preferably at least 640° C., more preferably at least 650° C.

Here, the temperature of the surface of the glass ribbon can be measured by using a radiation pyrometer.

The glass ribbon taken out from the float bath is preferably annealed to the room temperature range within a time of 20 minutes. Then, the glass ribbon is cut into a desired size to obtain the glass substrate of the present invention.

The glass substrate of the present invention is particularly suitable as a glass substrate for a flat panel display, more particularly for a PDP, and in addition, it can be used also as a glass substrate for a solar cell.

EXAMPLES

Now, the present invention will be described in further detail with reference to Examples. However, it should be understood that the present invention is by no means restricted to such specific Examples.

Experimental Examples relating to the present invention are shown in Table 1. Examples 1 to 10 are Examples of the present invention, and Examples 11 to 13 are Comparative Examples. In Table 1, numerical values in brackets are calculated values.

Raw materials of the respective components were blended so as to achieve the composition as identified in Table 1, heated to from 1,550 to 1,650° C. by using a platinum crucible and melted over a period of from 4 to 5 hours. For melting, a platinum stirrer was inserted, and stirring was conducted for 2 hours to homogenize the glass. In Table 1, only the main components are shown, and 100 mass % is achieved by all the components including trace components.

Using the glass thus obtained, the specific gravity, the average thermal expansion coefficient, Log $\rho$ ($\rho$ is the volume resistivity ($\Omega \cdot cm$) at 150° C.), the glass transition temperature (Tg), the temperature $T_2$ (log $\eta=2$) at which the viscosity becomes $10^2$ dPa·s, which is an index indicating the melting characters, the temperature $T_2$ (log $\eta=4$) at which the viscosity becomes $10^4$ dPa·s, which is an index indicating the float formability, and the color difference value b* were measured by the following methods.

Specific Gravity:
About 20 g of a glass block containing no bubble is subjected to measurement by Archimedes' principle.

Average thermal expansion coefficient (unit: $\times 10^{-7}$/° C.):
By means of a differential thermal dilatometer and using quartz glass as a reference sample, the rate of elongation of glass when it is heated from room temperature at a rate of 5° C./min is measured. The measurement is conducted to a temperature (yield point) at which the glass is softened and elongation is no longer observed to calculate the average linear thermal expansion coefficient from 50 to 350° C.

Glass transition temperature (Tg, unit: ° C.):
The critical point in the thermal expansion curve was taken as the glass transition temperature.

Viscosity:
The above obtained glass was melted and the viscosity was measured by a rotary viscometer to measure the temperature $T_2$ when the viscosity $\eta$ became $10^2$ dPa·s and the temperature $T_4$ when the viscosity became $10^4$ dPa·s.

Measurement of Value b*:
The above obtained glass was melted, cast into a plate shape and annealed, and both surfaces thereof were mirror polished to obtain plate glass having a thickness of 2.8 mm. On the surface of the plate glass, a silver paste (manufactured by DuPont, DOTITE) was applied, the temperature was increased at a rate of 200° C./hr, followed by firing at 560° C. for one hour, the temperature was decreased to room temperature at a rate of 60° C./hr, the silver paste was removed by a 10 mass % nitric acid aqueous solution, and then the visible light transmittance was measured. With respect to the yellow coloring on the surface under silver electrodes and their periphery, the color difference value b* of the L*a*b* color coordinate system of illuminant C was determined by the method as disclosed in JIS Z8729 from the above value of the visible light transmittance.

On the other hand, the glass in Example 11 has an average thermal expansion coefficient exceeding $90 \times 10^{-7}/°C$., which is different from that of soda lime glass, and accordingly it is hardly used for a PDP. Further, it has a low glass transition temperature (Tg) and accordingly it may undergo thermal deformation or thermal shrinkage by the heat treatment in the procedure for production of a PDP. Further, since the tem-

TABLE 1

|  | Ex. 1 | Ex. 2 | Ex. 3 | Ex. 4 | Ex. 5 | Ex. 6 | Ex. 7 |
|---|---|---|---|---|---|---|---|
| $SiO_2$ | 59.8 | 60.4 | 60.4 | 60.7 | 60.4 | 60.5 | 60.7 |
| $Al_2O_3$ | 6.4 | 5.8 | 5.3 | 4.6 | 5.0 | 4.9 | 4.5 |
| MgO | 8.6 | 8.2 | 8.5 | 8.2 | 8.2 | 8.4 | 8.3 |
| CaO | 3.5 | 4.0 | 3.1 | 2.6 | 3.1 | 2.9 | 3.3 |
| SrO | 4.0 | 4.0 | 4.0 | 4.0 | 4.0 | 4.0 | 4.0 |
| BaO | 0.0 | 0.0 | 0.0 | 0.0 | 0.0 | 0.0 | 0.0 |
| $ZrO_2$ | 2.9 | 3.0 | 3.6 | 4.3 | 3.9 | 4.0 | 3.8 |
| $Na_2O$ | 3.6 | 3.5 | 3.4 | 3.1 | 3.0 | 3.2 | 3.0 |
| $K_2O$ | 11.1 | 11.0 | 11.6 | 12.4 | 12.3 | 12.0 | 12.3 |
| $Fe_2O_3$ | 0.08 | 0.08 | 0.08 | 0.08 | 0.08 | 0.08 | 0.08 |
| Total of RO | 16.1 | 16.2 | 15.6 | 14.8 | 15.3 | 15.3 | 15.6 |
| Total of $R_2O$ | 14.7 | 14.5 | 15.0 | 15.5 | 15.3 | 15.2 | 15.3 |
| Specific gravity | 2.59 | 2.59 | 2.59 | 2.60 | 2.59 | (2.59) | 2.59 |
| Average thermal expansion coefficient | 83.5 | 83.2 | 83.2 | 83.3 | 83.3 | (83.0) | 84.0 |
| Logρ | 12.1 | 12.2 | 12.2 | 12.1 | 12.1 | (12.0) | 12.3 |
| Tg | 645 | 643 | 647 | 651 | 652 | (647) | 644 |
| $T_2$ | 1519 | (1529) | 1526 | 1528 | 1525 | (1536) | 1516 |
| $T_4$ | 1142 | (1141) | 1149 | 1160 | 1156 | (1151) | 1147 |
| b* | 3.5 | 3.9 | 4.9 | 5.8 | (5.4) | (4.6) | 4.6 |

|  | Ex. 8 | Ex. 9 | Ex. 10 | Ex. 11 | Ex. 12 | Ex. 13 |
|---|---|---|---|---|---|---|
| $SiO_2$ | 59.4 | 60.1 | 60.3 | 60.9 | 68.3 | 63.6 |
| $Al_2O_3$ | 6.4 | 5.6 | 5.1 | 9.2 | 2.8 | 1.8 |
| MgO | 8.2 | 8.3 | 8.3 | 2.4 | 4.5 | 3.8 |
| CaO | 3.6 | 3.6 | 3.4 | 3.4 | 6.3 | 4.5 |
| SrO | 4.0 | 4.0 | 4.0 | 3.1 | 0.0 | 0.0 |
| BaO | 0.0 | 0.0 | 0.0 | 0.0 | 3.1 | 0.0 |
| $ZrO_2$ | 3.7 | 3.7 | 3.7 | 4.4 | 2.1 | 10.2 |
| $Na_2O$ | 3.5 | 3.5 | 3.2 | 6.5 | 4.9 | 0.0 |
| $K_2O$ | 11.1 | 11.1 | 11.9 | 10.0 | 7.9 | 16.0 |
| $Fe_2O_3$ | 0.08 | 0.08 | 0.08 | 0.08 | 0.08 | 0.08 |
| Total of RO | 15.8 | 15.9 | 15.7 | 8.9 | 13.9 | 8.3 |
| Total of $R_2O$ | 14.6 | 14.6 | 15.1 | 16.5 | 12.8 | 16.0 |
| Specific gravity | 2.60 | 2.60 | 2.60 | 2.56 | 2.54 | 2.57 |
| Average thermal expansion coefficient | 82.7 | 81.8 | (82.8) | 90.2 | 79.7 | 69.0 |
| Logρ | 12.2 | 12.2 | (12.0) | 10.4 | 11.6 | 10.9 |
| Tg | 647 | 647 | (649) | 611 | 613 | 709 |
| $T_2$ | (1528) | (1528) | (1531) | 1637 | 1581 | 1633 |
| $T_4$ | (1146) | (1144) | (1147) | 1205 | 1145 | 1224 |
| b* | 4.0 | 4.1 | (5.5) | 19.0 | 16.7 | 0.1> |

As evident from Table 1, the specific gravity of the glass composition of the present invention is at most 2.7, whereby weight saving of a component is readily achieved. The thermal expansion coefficient is within a range of from $80 \times 10^{-7}$ to $90 \times 10^{-7}/°C$., which is at the same level as the thermal expansion coefficient of soda lime glass which has been used as a substrate for a PDP, and accordingly the same type of frit materials can be used. Further, the glass transition temperature is at least 640° C. in all the Examples, and accordingly there will be no problem such that the glass will be deformed or shrink in preparation of a large-sized PDP. Further, $T_2$ is at most 1,550° C., whereby good melting characters were confirmed. Further, $T_4$ is at most 1,165° C., whereby good float formability were also confirmed. Still further, b* is at most 8, whereby it was confirmed that the yellowing hardly occur.

perature $T_2$ (log η=2) at which the viscosity becomes $10^2$ dPa·s exceeds 1,550° C., the melting characters are worse, and the productivity is low. Further, since b* exceeds 8, the yellowing may occur.

Further, the glass in Example 12 has an average thermal expansion coefficient less than $80 \times 10^{-7}/°C$., which is different from that of soda lime glass, and accordingly it is hardly used for a PDP. Further, it has a low glass transition temperature (Tg), and accordingly it may undergo thermal deformation or thermal shrinkage by the heat treatment in the procedure for production of a PDP. Further, since the temperature $T_2$ (log η=2) at which the viscosity becomes $10^2$ dPa·s exceeds 1,550° C., the melting characters are worse, and the productivity is low. Further, since b* exceeds 8, the yellowing may occur.

Further, the glass in Example 13 has an average thermal expansion coefficient less than $80\times10^{-7}$/° C., and accordingly it is hardly used for a PDP. Further, since the temperature $T_2$ (log η=2) at which the viscosity becomes $10^2$ dPa·s exceeds 1,550° C., the melting characters are low, and the productivity is low.

PREPARATION EXAMPLES

Raw materials of the respective components are blended so as to achieve the glass composition as identified in Examples 1 to 10 in Table 1, charged in a melting furnace and melted at from 1,300 to 1,800° C. Then, the resulting molten glass is formed into a glass ribbon having a thickness of from 1.2 to 2.8 mm by the float process and annealed. Here, the hydrogen concentration in the atmosphere of the float bath is 10%, the glass ribbon retention time in the float bath is from 5 to 12 minutes, the temperature of the surface of the glass ribbon in the float bath is from 950 to 1,200° C. at the upstream side and from 840 to 950° C. at the downstream side, and the temperature of the surface of the glass ribbon when annealing is started is from 650 to 700° C. After the annealing, the glass ribbon is cut into predetermined dimensions. By such a production process, a glass substrate which has a high glass transition temperature, which has a thermal expansion coefficient close to that of soda lime glass, which has a low specific gravity and which will hardly undergo yellowing, is obtained. Such a glass substrate has good melting characters when melted, and can be produced with high productivity.

INDUSTRIAL APPLICABILITY

The glass substrate of the present invention has a high glass transition temperature, has a thermal expansion coefficient close to that of soda lime glass, has a low specific gravity and will hardly undergo yellowing, and further has good melting characters and is thereby produced with high productivity, and accordingly preferably used as a glass substrate for a flat panel display, more particularly for a PDP.

The entire disclosure of Japanese Patent Application No. 2008-330200 filed on Dec. 25, 2008 including specification, claims and summary is incorporated herein by reference in its entirety.

What is claimed is:

1. A process for producing a glass substrate, which comprises forming molten glass obtained by melting raw materials into a glass ribbon in a float bath, annealing the glass ribbon by a cooling apparatus and cutting the glass ribbon to form the glass substrate, wherein a hydrogen concentration in an atmosphere of the float bath exceeds 3%, and a glass retention time in the float bath is from 4 to 15 minutes, wherein the glass substrate has a composition comprising, as represented by mass percentage based on oxides,

| | |
|---|---|
| $SiO_2$ | 55 to 65%, |
| $Al_2O_3$ | 4 to 8%, |
| MgO | 6 to 9%, |
| CaO | 0.1 to 5%, |
| SrO | 0.5 to 6%, |
| BaO | 0 to 2%, |
| MgO + CaO + SrO + BaO | 6.6 to 19%, |
| $Na_2O$ | 0 to 5%, |
| $K_2O$ | 9.5 to 21%, |
| $Na_2O + K_2O$ | 10 to 22%, |
| $ZrO_2$ | 0.5 to 5%, |
| $Fe_2O_3$ | 0.06 to 0.15%, | where the composition has a specific gravity of at most 2.7, an average thermal expansion coefficient from 50 to 350° C. of from $80\times10^{-7}$/° C. to $90\times10^{-7}$/° C., and a glass transition temperature of at least 640° C., and wherein when a viscosity is η, the temperature at which log η=2 is satisfied is at most 1,550° C., and a yellow coloring b* on a surface of the glass is at most 8 after a silver paste is applied on the glass surface, followed by firing, and then the silver paste is removed.

2. The process for producing the glass substrate according to claim 1, wherein the temperature of the glass ribbon in the float bath is at most 1,200° C., and the temperature of the glass ribbon when the annealing is started is at least 640° C.

3. The process for producing the glass substrate according to claim 1, wherein an amount of $Na_2O$ is from 0 to 4.5% an amount of $K_2O$ is from 10 to 14%.

4. The process for producing the glass substrate according to claim 1, wherein $SiO_2$ is present in an amount of from 55 to 64%.

5. The process for producing the glass substrate according to claim 1, wherein $SiO_2$ is present in an amount of from 55 to 63%.

6. The process for producing the glass substrate according to claim 1, wherein $SiO_2$ is present in an amount of from 55 to 62%.

7. The process for producing the glass substrate according to claim 1, wherein $Al_2O_3$ is present in an amount of from 4 to 7.5%.

8. The process for producing the glass substrate according to claim 1, wherein $Al_2O_3$ is present in an amount of from 4 to 7%.

9. The process for producing the glass substrate according to claim 1, wherein $Al_2O_3$ is present in an amount of from 4 to 6.5%.

10. The process for producing the glass substrate according to claim 1, wherein MgO is present in an amount of from 6.5 to 9%.

11. The process for producing the glass substrate according to claim 1, wherein MgO is present in an amount of from 7 to 9%.

12. The process for producing the glass substrate according to claim 1, wherein MgO is present in an amount of from 7.5 to 9%.

13. The process for producing the glass substrate according to claim 1, wherein CaO is present in an amount of from 0.5 to 4.5%.

14. The process for producing the glass substrate according to claim 1, wherein CaO is present in an amount of from 1 to 4.5%.

15. The process for producing the glass substrate according to claim 1, wherein SrO is present in an amount of from 1.6 to 6%.

16. The process for producing the glass substrate according to claim 1, wherein SrO is present in an amount of from 3 to 5%.

17. The process for producing the glass substrate according to claim 1, wherein the composition further comprises at least one member selected from the group consisting of $As_2O_3$, $Sb_2O_3$, $P_2O_5$, F and Cl in an amount of at most 2%.

18. The process for producing the glass substrate according to claim 1, wherein the composition further comprises at least one member selected from the group consisting of $La_2O_3$, $TiO_2$, and $SnO_2$ in an amount of at most 5%.

* * * * *